United States Patent
Mangalore

(10) Patent No.: US 12,047,498 B2
(45) Date of Patent: Jul. 23, 2024

(54) TRANSLATING PROTECTED CONTENT IN A VIDEO PROCESSING SERVER

(71) Applicant: ARRIS Enterprises LLC, Suwanee, GA (US)

(72) Inventor: Geetha Mangalore, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 140 days.

(21) Appl. No.: 17/472,214

(22) Filed: Sep. 10, 2021

(65) Prior Publication Data
US 2022/0083628 A1 Mar. 17, 2022

Related U.S. Application Data

(60) Provisional application No. 63/078,767, filed on Sep. 15, 2020.

(51) Int. Cl.
| | |
|---|---|
| *H04L 9/08* | (2006.01) |
| *H04L 9/32* | (2006.01) |
| *H04N 21/2347* | (2011.01) |
| *H04N 21/4405* | (2011.01) |
| *G06F 21/10* | (2013.01) |

(52) U.S. Cl.
CPC .......... *H04L 9/0861* (2013.01); *H04L 9/3263* (2013.01); *H04N 21/2347* (2013.01); *H04N 21/4405* (2013.01); *G06F 21/1062* (2023.08); *G06F 2221/2141* (2013.01); *H04L 2209/603* (2013.01)

(58) Field of Classification Search
None
See application file for complete search history.

(56) References Cited

U.S. PATENT DOCUMENTS

2017/0147830 A1* 5/2017 Park .................. G06F 21/121

OTHER PUBLICATIONS

DASH Industry Forum: "DASH-IF Specification V5.0.0 (Nov. 2019)", 3GP Draft; S4-20054, 3rd Generation Partnership Project (3GPP), Mobile Competence Centre; 650, Route Des Lucioles; F-06921 Sophia-Antipolis Cedex; France. Published online Mar. 31, 2020. Retrieved from the Internet on Mar. 31, 2020. URL: FTP. 3gpp.org/tsg_SA/WG4_CODEC/TSG4_108-e/Docs/S4-200554.zip.

(Continued)

*Primary Examiner* — Brandon Hoffman
(74) *Attorney, Agent, or Firm* — Chernoff, Vilhauer, McClung & Stenzel, LLP

(57) ABSTRACT

A method and system provide the ability to process video content on a headend. A video processing server authenticates with a key server and public keys are exchanged. The key server generates and places a content key into a document that is signed with the public key. A client on the video processing server receives the document, extracts the content key, and saves the content key to a database. The video content is encrypted using the content key and DRM signaling elements are added to a manifest. The encrypted video content and manifest are received in the head end, a key ID is extracted from the manifest and provided to the CPIX client to retrieve the content key from the CPIX document. The encrypted video content is decrypted using the content key resulting in clear content that is provided to a downstream packager that encrypts and repackages the content for transmission to recipients.

9 Claims, 5 Drawing Sheets

(56) References Cited

OTHER PUBLICATIONS

Qualcomm Incorporated: "DASH-based Ingest", 3GPP Draft; S4-190850—DASH INGEST, 3rd Generation Partnership Project (3GPP), Mobile Competence Centre; 650, Route Des Lucioles; F-06921 Sophia-Antipolis Cedex; France. Published online Aug. 12, 2019. Retrieved from the Internet on Aug. 12, 2019. URL: www.3gpp.org/ftp/meetings_3gpp_SYNC/SA4/Docs/S4-190850.zip.

PCT International Searching Authority, "PCT International Search Report and Written Opinion," International Application No. PCT/US2021/046363, Issued Jan. 4, 2022.

* cited by examiner

TRANSLATING PROTECTED CONTENT IN A VIDEO PROCESSING SERVER

CROSS-REFERENCE TO RELATED APPLICATIONS

This application claims the benefit of U.S. Provisional Patent Application Ser. No. 63/078,767 filed Sep. 15, 2020.

BACKGROUND

1. Field

The present disclosure relates to systems and methods for processing video, and in particular to a system and method for translating encrypted video streams.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

Content distribution networks (CDNs) usually include a content source, data center, or headend that transmits content to client devices in possession of end users (e.g., subscribers) or a content provider that generates content and transmits the content to client devices (for eventual transmission to end users). Exemplary client devices include set top boxes (STBs), cable modems, and integrated receiver/decoders (IRDs), but may also be embodied in smart phones, tablet computers, desktop computers, laptop computers, or any device capable of receiving, storing, retransmitting, or presenting content. Video processing in the headend may consist of multiple and independently scalable software functions that are deployed and operate in a container-based environment running on off the shelf (COTS) hardware. The software functions can be combined to perform video headend processing functions that enable operators to migrate from legacy headend equipment built using custom hardware to a software solution using standardized COTS hardware. In addition, there is a need for headend systems to have the capability to receive both clear and encrypted streams as input, perform the desired processing followed by the re-encryption in a desired output format including the use of standard and/or individualized digital rights management (DRM) encryption systems. Prior art systems fail to provide such support for receiving encrypted input streams, performing headend processing, and re-encrypting (e.g., using a DRM client).

To better understand the problems of the prior art, a description of prior art DRM systems may be useful. DRM systems control access to proprietary content using a variety of technologies. Typically, the content is encrypted using one or more encryption keys, and decrypted using one or more corresponding decryption keys by the device that provides the content for consumption or transmission elsewhere. Private data communicated between the client device and the headend is typically used to request and receive specific content encryption keys for protected media being consumed by the client.

Typically, a DRM system requires a means of identifying and authorizing a particular client device. To accomplish this, the device must be authenticated. That is, the client device must be able to demonstrate that it is the device it claims to be. To support such authentication, a root of trust may be provided at the client device. As the name implies, the root of trust is a secure data or algorithm in a cryptographic system that is presumed to be trusted. The root of trust can be used to derive other cryptographic assets such as content decryption keys and the like. If such content keys are compromised, new keys can be generated using the root of trust.

Authentication is typically performed by use of derived public/private keys to be used to generate and issue digital signatures, and application of cryptographic routines on private data that the DRM system wishes to send to remote server hosts. By applying the reverse cryptographic approach, the server can both uniquely identify a specific device platform and also verify that an authentic DRM client device is currently running and made the request.

DRM systems also may require means for identifying and authorizing a particular user or subscriber, for example, to provide higher level entitlement access control and other business critical features to such users or subscribers. This is normally a solution that requires third ($3^{rd}$) party augmentation (for example, using digital certificates or other authentication means from a certificate authority (CA)) on top of any existing DRM scheme.

In view of the above, it is desirable to provide a virtualized video processing solution built on off the shelf hardware and deployed in a data center headend that can both decrypt incoming encrypted input streams while also re-encrypting the stream using a standard DRM in a format compatible with proprietary DRM clients without the need to implement a DRM client in the headend.

SUMMARY OF THE INVENTION

To overcome the problems of the prior art, embodiments of the invention provide a method and system for processing video content on a headend. A video processing server authenticates with a key server. The key server then exchanges public keys with a client (where the client is part of the video processing server) (e.g., a CPIX client). The key server generates a content key (and associated attributes such as a crypto period and crypto algorithm of the content key) and a document (e.g., a CPIX document). The document generation includes populating the document with the content key (and associated attributes), and signing the document with the public key (that was exchanged). In addition, the key server may cache the content key in a database.

The client receives the document, extracts the content key from the document, and saves the content key to a database. The video content is encrypted using the content key resulting in encrypted video content, and digital rights management (DRM) signaling elements are added to a manifest (e.g., for the content). In one or more embodiments, an encryptor/packager encrypts the video content and adds the DRM signaling elements to the manifest. In addition, the encryptor/packager may send the encrypted video content and the manifest to the video processing server.

The encrypted video content and manifest are received in the video processing server. The video processing server extracts a key ID from the manifest (e.g., as the manifest is being parsed), provides the key ID to the client, and receives the content key from the client in response. Embodiments of the invention may utilize a push (e.g., where the service provider pushes the content key to the client) or pull (e.g., where the client pulls the content key from the key server)

implementation to acquire the content key. The encrypted video content is decrypted using the content key (and associated attributes) resulting in clear content that is provided to a downstream packager that encrypts and repackages the content for transmission to recipients.

In a system of embodiments of the invention, the system includes one or more computers having a memory storing a set of instructions and a processor that executes a set of instructions. A video processing server executes on one or more of the processors on a headend via the set of instructions.

The video processing server when executed causes the one or more processors to: (i) authenticate with a key server executing on a service provider; and (ii) exchange public keys between a client (e.g., a CPIX client) executing on the video processing server and the key server.

The service provider executes one or more of the processors via the set of instructions. The service provider, when executed, causes the one or more processors to: (i) use a key server, executing on the service provider, to generate a content key (and associated attributes such as a crypto period and crypto algorithm of the content key) that may be cached in a database; (ii) generate a document (e.g., a CPIX document) that includes populating the document with the content key (and the associated attributes), and signing the document with the public key that was exchanged; and (iii) encrypt the video content using the content key resulting in encrypted video content, and adding digital rights management (DRM) signaling elements to a manifest. In one or more embodiments, an encryptor/packager executed by the service provider encrypts the video content, adds the DRM signaling elements to the manifest, and sends the encrypted video content and the manifest to the video processing server.

The client executes on the video processing server, causing the one or more processors to: (i) receive the document, extract the content key, and save the content key to a database.

A video processing server front end executes on the video processing server, causing the one or more processors to: (i) receive the encrypted video content and manifest; (ii) extract a key ID from the manifest (e.g., dynamically as the manifest is being parsed); (iii) provide the key ID to the client and receive the content key from the client in response (e.g., via a pull implementation where the client pulls the content key from the key server, or via a push implementation where the key ID is pushed from the service provider to the client; (iv) decrypt the encrypted video content using the content key (and the associated attributes) resulting in clear content; and (v) provide the clear content to a downstream packager that encrypts and repackages the content for transmission to recipients.

BRIEF DESCRIPTION OF THE DRAWINGS

Referring now to the drawings in which like reference numbers represent corresponding parts throughout.

DETAILED DESCRIPTION

Figure 1:
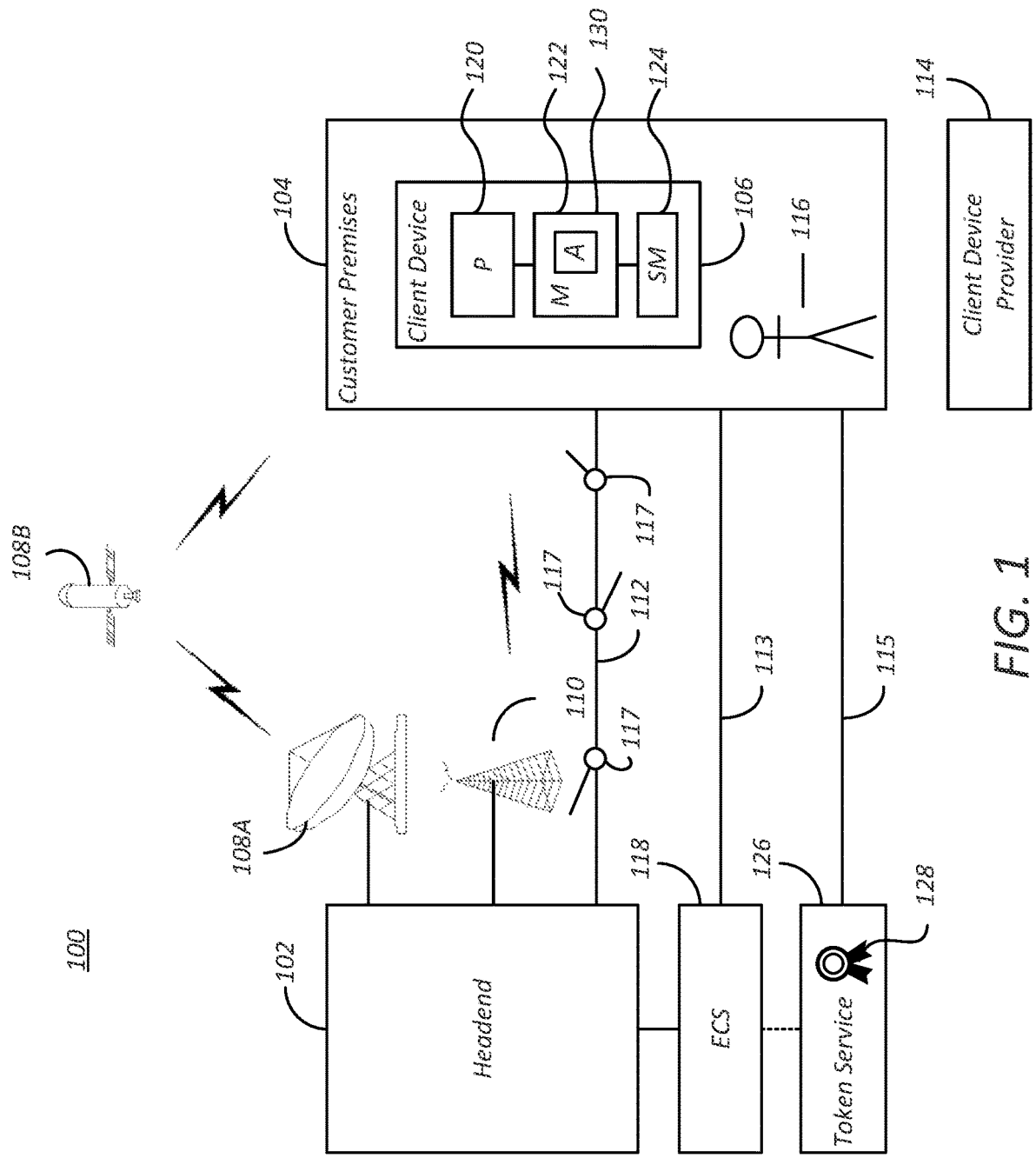
FIG. 1 is a diagram of an exemplary content distribution network (CDN) in accordance with one or more embodiments of the invention.

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Embodiments of the invention provide a virtualized video processing solution built on off the shelf hardware and deployed in a data center headend. The solution is made up of multiple and independently scalable software functions that operate in a container-based environment running on COTS hardware. The software functions can be combined to perform video headend processing functions that enable operators to migrate from legacy head end equipment built using custom hardware to a software solution using standardized COTS hardware. The solution provides an evolving set of video processing functions including:

Adaptive Bit Rate (ABR) translation (HLS [HTTP Live Streaming], DASH [Dynamic Adaptive Streaming over HTTP]) to Single Program Transport streams (SPTS);

Facilitate transition to ABR content distribution by converting ABR content in a CDN (HLS/DASH) to standard MPEG-2 (Motion Pictures Expert Group-2) transport streams for consumptions by legacy QAM (Quadrature Amplitude Modulation) based STBs (e.g., MOTOROLA MEDIACIPHER™), future DVB (digital video broadcasting) encryption;

Re-Multiplexing, Ancillary PID (packet identifier) insertion.

Prior art HLS ABR input to headend software systems are in the clear. However, embodiments of the invention support encrypted HLS/DASH input streams. If the input is encrypted, the decryption function must be supported by the headend software. In addition to transmux (meaning converting from HLS/DASH to Legacy MPEG-2 TS for example), the transcrypt of stream is also supported by software functions of embodiments of the invention. For example, embodiments decrypt incoming streams and re-encrypt to a legacy MPEG-2 TS MEDIACIPHER™ stream.

As a service provider (e.g., cable or satellite provider) may need to support DRM encrypted streams for various clients, one option is to encrypt the stream using a standard DRM and adding a DRM client to the headend system. However, adding a DRM client (e.g., the WIDEVINE™ DRM client) to a system is complex, due to the robustness rules and need to communicate to external DRM license servers, scalability, performance, time to integrate and maintenance of the DRM client.

To avoid such issues, embodiments of the invention provide a video processing server that is hosted in a private cloud. Accordingly, all that is required is for a stream to be encrypted using a standard such as ISO Common Encryption [3] adopted by most DRM/service providers and the ability to provide the keys to the video processing server in secure standard way.

In addition, instead of using a proprietary scheme, embodiments of the invention may utilize a standard format (e.g., the DASH CPIX [content protection information exchange format]) to exchange the keys between a service provider's encryptor and the video processing server. Such a standard format may be used for HLS, DASH or any standard input streams as the standard format (e.g., CPIX) is already used widely in a content preparation workflows and supports a container format that is generic, easy to adopt, and may be extended to include provider specific elements.

Further to the above, content protection signaling elements may be added to HLS Manifest and DASH MPD (media presentation description)[2]. DASH supports both fragmented MP4 and TS (transport stream) content formats. DASH-TS is the content format required for many service providers that service broadband clients. Such service providers can use the same encrypted segments as input to the video processing server which is generated for other IP (internet protocol) clients protected by standard DRM's (e.g., the WIDEVINE™ DRM/PLAYREADY™ DRM).

In addition, minimal modifications are required to a service provider's content preparation workflow and virtualized video processing infrastructure used in transcrypting the content. Basically, embodiments of the invention use a standard (e.g., the CPIX standard) in an existing video processing cloud system to handle protected content in standard formats, decrypt, and re-encrypt to the protection system of a downstream client.

Even though CPIX standard may have been used for content preparation flow and/or in DRM servers, content providers, packagers, encoders/encryptors, such a standard encryption format has not been used in a DRM client or in embodiments of the invention where a video processing server ingests protected content.

Content Distribution System

FIG. 1 is a diagram of an exemplary content distribution network (CDN) 100 utilized in accordance with one or more embodiments of the invention. The CDN 100 comprises content source or headend 102 (e.g., that receives content from a service provider). The headend 102 may be a multi system operator (MSO) that transmits content to a client devices 106 in possession of end users 116 (subscribers) or a content provider that generates content and transmits the content to client devices 106 in possession of MSOs (for eventual transmission to end users). Exemplary client devices 106 include set top boxes (STBs), cable modems, and integrated receiver/decoders (IRDs), but may also be embodied in smart phones, tablet computers, desktop computers, laptop computers, or any device capable of receiving, storing, retransmitting, or presenting content. Client devices 106 are alternatively referred to as customer provided equipment (CPEs).

The client device 106 includes the processor 120 communicatively coupled to a typically volatile and random access memory 122 and a non-volatile memory 124, which may be a secure memory. Typically, the client device 106 is installed in the customer premises 104 such as a home or MSO facility, but the client device 106 may be installed in motor vehicle or be carried on the user's person.

In many instances, the client devices 106 provided to the users 116 are manufactured (at least in part) by a client device provider 114. In some embodiments, the client device provider 114 manufactures client devices 106 of one hardware design that can be used with different headends 102, each having different functional requirements. Typically, this is accomplished through modification of the software and/or firmware of the client device 106. The client device provider 114 may also manufacture client devices 106 with different hardware functionality for different headends 102.

Typically, the content and private data transmitted between the headend 102 and the client devices 106 is encrypted or otherwise obfuscate it to protect it from being received by unauthorized entities. Consequently, CDNs 100 typically include a conditional access system (CAS) in which content is encrypted by the headend 102 before transmission to client devices 106, and the client devices 106 decrypt the data transmitted by the headend 102. Client devices 106 may also have the capability to encrypt data transmitted from the client device 106 to the headend 102.

The headend 102 may transmit data via a wired network 112 that includes a plurality of communication nodes 117 interconnected by optical cable or conductive wire. The headend 102 may also transmit data via a wireless connection such as via a terrestrial transmitter 110 or a satellite broadcast system in which data is transmitted via a ground station 108A and a satellite 108B.

In some cases, the CDN 100 also permits the users' client device 106 to transmit information to the headend 102 or an entitlement control service (ECS) 118 such as license server. Accordingly, the CDN 100 permits information to be transceived (e.g. transmitted and received) by the headend 102 and ECS 118, and the client device 106. Further, such communication between systems may be asymmetric, with data being transmitted from the headend 102 to the client device 106 via one transmission method, and data being transmitted from the client device 106 to the headend 102 or ECS 118 by another transmission method. For example, it is known for headends 102 to transmit content to subscribers 116 having a client device 106 via satellite 108, but data to be transmitted from the client device 106 to the headend 102, ECS 118 or token service 126 to be transmitted via a communication links such as 112, 113 or 115. The token service 126 may include, for example, a token issuer 126 that issues access token(s) 128 and a token validator 126, that validates access tokens 128.

For example, the client device 106 may require updated encryption keys (required to decrypt content) when requesting such content or on an occasional basis. In such instances, the client device 106 establishes a secure communication channel with the entitlement control service (ECS) 118 via communication link 113 to obtain a license having such encryption keys, or a means of generating such encryption keys. As a part of this secure communications channel, the client device 106 and the ECS 118 authenticate one another, to verify that each entity is what they claim to be. This is typically accomplished by the exchange of digital certificates signed by a certificate authority (CA) or in intermediate entity. Accordingly, the client device 106 is typically provisioned with a digital certificate for this purpose. For security purposes, such digital certificates expire after passage of time, and a new certificate must be generated and issued. Further, in some embodiments, when the client device 106 desires transmission of encrypted content from the headend 102, the client device 106 first obtains an access token 128 from a token service 126, and presents the access token 128 along with the request for a license, which is presented to the ECS 118.

CPIX Flow and Overview of System Components

Figure 2:
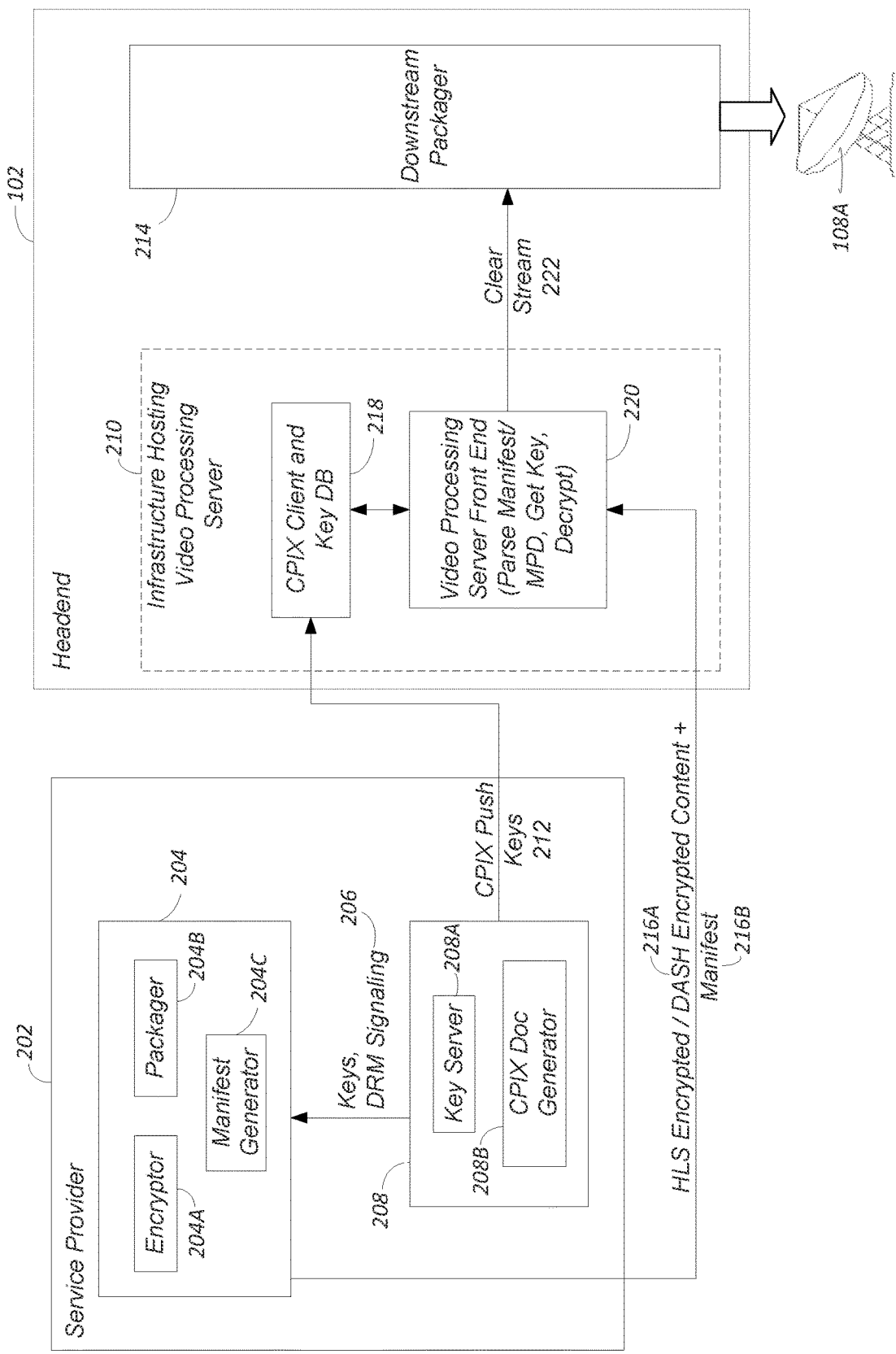
FIG. 2 illustrates an overview of the architecture/infrastructure for processing video content in accordance with one or more embodiments of the invention.

FIG. 2 illustrates an overview of the architecture/infrastructure for processing video content in accordance with one or more embodiments of the invention. As described above, the headend 102 may be operated/controlled by a service provider 202 that provides the content to the head end for transmission to client devices via cable or satellite 108A. The content to be delivered is received from various content/service providers 202 (e.g., television networks, studio, etc.). A feature provided by various systems is to ensure the security of the content throughout the content pipeline (e.g., from service provider 202 to headend 102 and to client devices 106).

The video processing server 210 can be considered a DRM server when using a CPIX document for exchanging the keys 212 with a key server 208A (e.g., an IRDETO™ key server) that is used to generate keys for multiple DRMs. As illustrated in FIG. 2, CPIX document generation (e.g., via CPIX Doc Generator 208B) may be part of the key server 208A but can be hosted separately. A further description of each of the system components of FIG. 2 follows.

Box 204 includes the encryptor 204A, packager 204B, and manifest generator 204C. The encryptor 204A is the component that encrypts. The packager 204B packages content inserting DRM Signaling 206 and Metadata into media files of the service provider 202. The manifest generator 204C is the component that generates HLS Manifests 216B, and the DASH MPD to describe the media presentation. Content protection elements may include keyID, content protection specific system ID, and specific information to acquire keys/licenses (e.g., for the service provider 202). The manifest generator 204C may also add vendor specific data as part of the EXT_X_KEYTAG or the content protection MPD element which is inserted while generating the manifest 216B by the packager 204B.

Box 208 includes the key server 208A/CPIX document generator 208B (collectively referred to as key server/doc generator 208). Key server 208A component generates keys 212 required to encrypt the content 216A, and manages key rotation and key periods (for the service provider 202).

The CPIX document generator 208B component generates a CPIX document that contains keys 212 and attributes for protected content (for the service provider 202).

The CPIX Client 218 is the component that establishes a connection with the CPIX document generator 208B, handles authentication with the CPIX generator 208B, and obtains the CPIX document (e.g., via a GET operation). After obtaining the CPIX document, the CPIX client 218 extracts keys and content protection specific attributes, and saves them in the key database.

The video processing server front end 220 is the component that receives HLS Manifests 216B, DASH MPDs and protected media segments (e.g., HLS encrypted content 216A). The front end 220 parses the manifest 216B/MPD to extract the key ID and attributes. After parsing the HLS Manifest 216B/DASH MPD, the front end 220 will get the keys 212 from the local database (e.g., the CPIX client and key database 218) using key ID from the manifest 216B/MPD as a look up. If the keys are hosted on a different server (e.g., to use CPIX), SSL can be used between a key DB and the front end 220.

A decryptor within front end 220 is the component that decrypts segments (e.g., from the HLS encrypted content 216A) to provide the clear stream 222 to the downstream packager 214.

The downstream packager 214 re-encrypts and repackages the content based on the required downstream format (e.g., MEDIACIPHER).

Since the key server 208A generates the keys 212, the encryptor producer model of the CPIX document can be used to push the keys 212 to the video processing server 210. The pushed, keys 212 need to be saved (e.g., cached) in a database for the video processing server front end 220 to retrieve later during decryption. A pull model may also be used by the video processing server 210 if it provides the functions to keep up with the key expiry, rotation and key requests based on the key IDs present in the current manifest 216B/MPD.

Logical Flow

Figure 3:
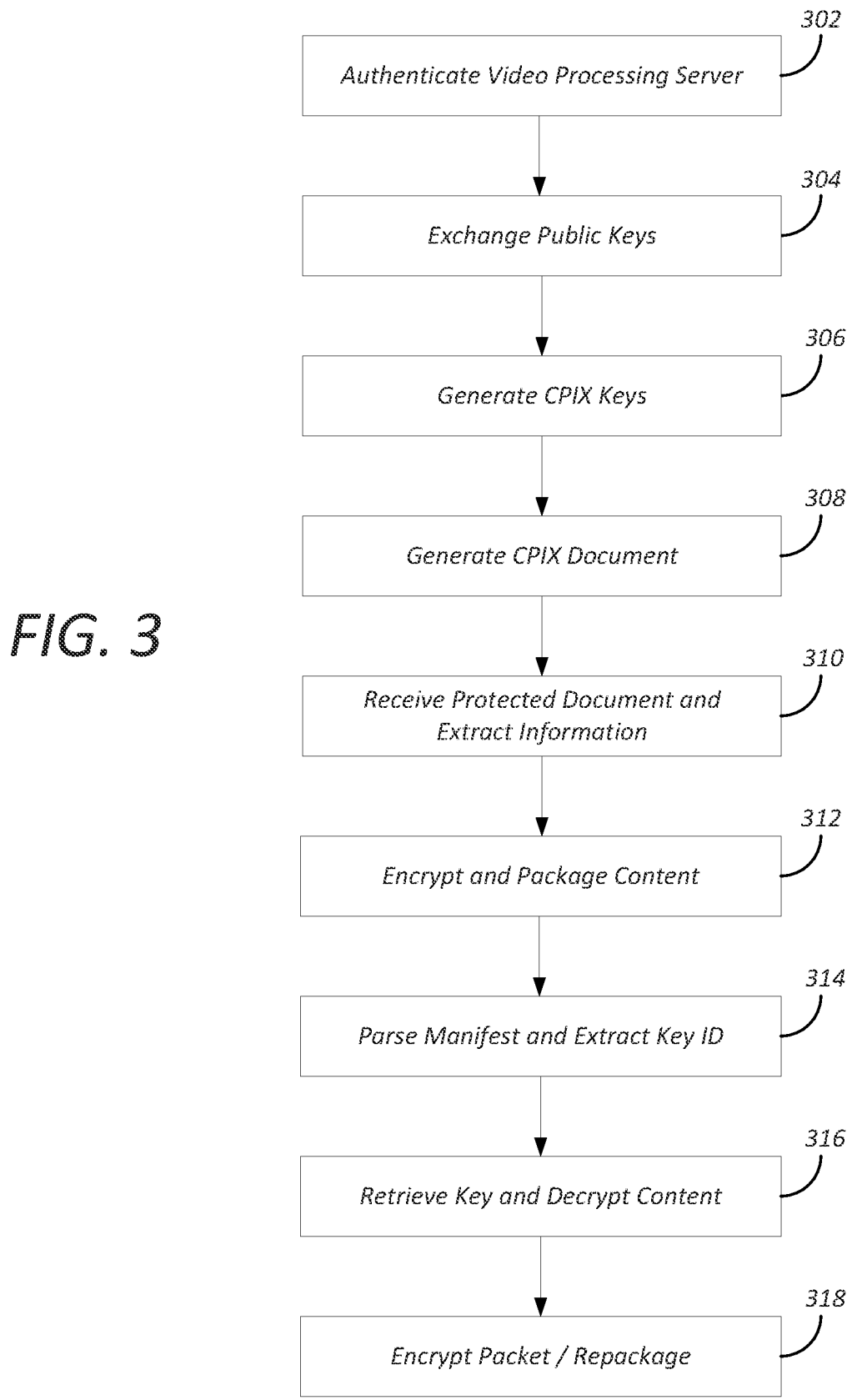
FIG. 3 illustrates the logical flow for processing video on a headend for an exemplary push case scenario in accordance with one or more embodiments of the invention.

FIG. 3 illustrates the logical flow for processing video on a headend in accordance with one or more embodiments of the invention. In particular, the flow of FIG. 3 describes an exemplary push case (i.e., for pushing CPIX keys to a video processing server).

At step 302, a video processing server 210 authenticates with the key server 208A (or the server hosting CPIX document generation 208B) (e.g., using an X.509 certificate).

At step 304, the key server 208A exchanges public keys with the CPIX client 218, and the document key is generated by the key server 208A and CPIX client 218.

At step 306, the key server 208A generates the keys 212 and attributes associated with the (crypto) key (e.g., crypto period, crypto algorithm of the keys).

At step 308, the CPIX document generator 208B generates the CPIX document, populating the document with encrypted content keys 212 and attributes. The CPIX document is signed with the public key exchanged with the video processing server 210.

At step 310, the protected document is sent (push) to the video processing server CPIX client 218. The video processing server CPIX Client 218 then extracts the keys 212, Key IDs and attributes and saves them to a local database.

At step 312, the encryptor 204A/packager 204B encrypts the content (resulting in encrypted content 216A) and adds DRM signaling elements to the manifest 216B/MPD.

At step 314, the video processing server 210 (i.e., the video processing server front end 220) extracts the key id from the manifest/MPD 216B as the manifest 216B is being parsed.

At step 316, the key IDs are sent to the CPIX client 218 (i.e., by the video processing front end 220) to get the keys from its already populated local key database (i.e., saved in step 310), and the keys are retrieved therefrom. In addition, step 316 includes decrypting the content 216A using a decryptor.

At step 318, a downstream packager 214 encrypts the packets and repackages the content into a desired format.

Figure 4:
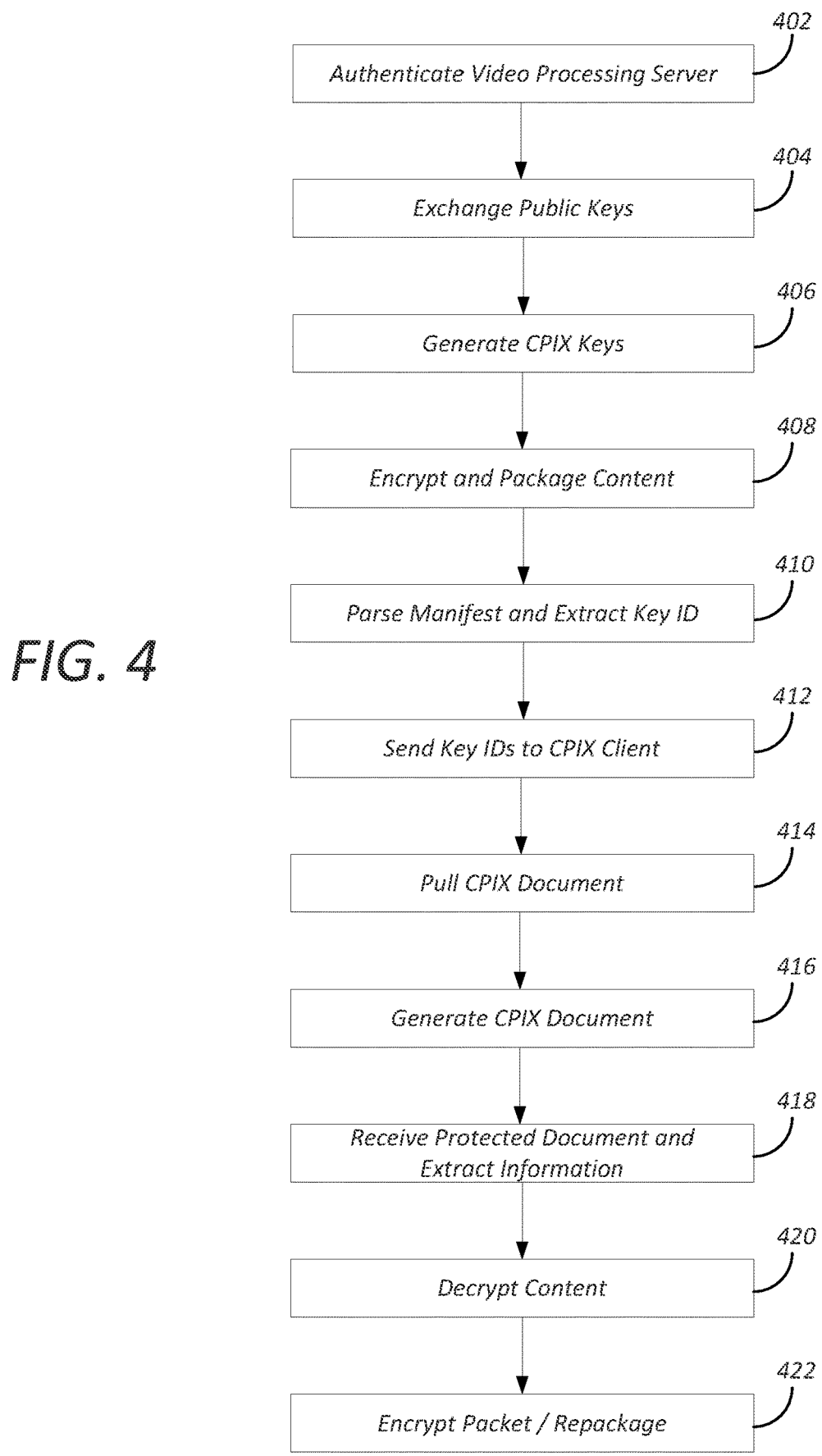
FIG. 4 illustrates the logical flow for processing video on a headend for an exemplary pull case scenario in accordance with one or more embodiments of the invention.

While FIG. 3 illustrates the logical flow for processing video on a headend for a push case scenario, FIG. 4 illustrates the logical flow for processing video on a headend for an exemplary pull case scenario in accordance with one or more embodiments of the invention.

At step 402, the video processing server 210 authenticates with the key server 208A (or the server hosting CPIX document generator 208B) (e.g., using X.509 certificate).

At step 404, the key server 208A exchanges public keys with the CPIX client 218, and the document key is generated by the key server 208A and CPIX client 218.

At step 406, the key server 208A generates the CPIX keys 212, as well as attributes associated with the crypto key such as the crypto period and the crypto algorithm of the keys. Step 406 also includes caching the CPIX keys 212 and attributes in a database.

At step 408, the encryptor 204A/packager 204B encrypts the content 216A and adds DRM signaling elements 206 to the manifest/MPD 216B.

At step 410, the video processing server 210 extracts key IDs from the manifest/MPD 216B as the manifest 216B is being parsed.

At step 412, the key IDs are sent to the CPIX client 218 to get the keys from key server 208A.

At step 414, the CPIX client 218 sends a pull request (e.g., an HTTP GET) for the CPIX document for the required Keys IDS.

At step 416, the key server 208A generates the CPIX document, populating the document with encrypted content keys and attributes, and signs the CPIX document with the exchanged public key (i.e., exchanged with the video processing server 210).

At step 418, the protected CPIX document is sent to the video processing server CPIX client 218. The video processing server CPIX Client 218 then extracts the keys, key IDs and attributes, and provides them to the video processing front end 220.

At step 420, the content 216A is decrypted (e.g., using a decryptor).

At step 422, the downstream packager 214 receives the clear stream 222, encrypts the packets and repackages to the desired format.

Key Exchange Infrastructure Details

While the above provides overview of the method and system for processing video content, details regarding each of the various components may be useful to better understand the invention. This section provides the details regarding the key exchange infrastructure.

Embodiments of the invention may utilize DASH-IF CPIX (DASH Industry Forum Content Protection Information Exchange format) guidelines to obtain keys from an encryptor/packager/manifest generator 204 of a service provider 202 if the input content stream (i.e., into the headend 102) is encrypted. CPIX provides guidance to exchange content keys and DRM information among entities while generating protected content covering different workflows between encryptors 204A, keyservers 208A, packagers 204B and DRM servers. The format includes DASH, HLS, HDS (HTTP Dynamic Streaming) and can be extended to other formats.

The CPIX document itself can be encrypted, signed and authenticated. Entities exchanging CPIX documents (e.g., the service provider 202 and video processing server 210) are authenticated to each other and a content key in the CPIX document is encrypted with a document/public encryption key. The CPIX document may also be digitally signed. The generation of signing and encryption algorithms is defined in the CPIX standard and utilizes common signing and encryption algorithms. A description of the CPIX standard is set forth in [5].

If hosted on a private network, a video processing server 210 (also referred to as an infrastructure hosting video processing server) of embodiments of the invention may utilize a X.509 certificate from any authorized CA (certificate authority) provider for authentication. If hosted on a public network, a video processing server of embodiments of the invention may utilize an N-MESH™ (white box) technology for implementing crypto algorithms for CPIX. Such technology may also be used for an obfuscation tool as well to add robustness.

As described above, prior art systems currently stream clear HLS to video processing servers in the headend 102. However, it is desirable to receive input streams that are DASH or HLS encrypted (e.g., to enable the streaming of protected content). Key signaling, generation and key exchange flows are described below for both HLS and DASH. DASH supports both ISO Base Media file format and MPEG2-TS content formats.

Set forth below is a detailed description of key generation, signaling, and the exchange between the service provider 202 infrastructure and the video processing server 210.

Key Generation, Insertion and Distribution

Service providers 202 may utilize a multi-DRM system for IP client content protection (e.g., IRDETO's Multi DRM system). Such a multi-DRM system may provide a key server 208A that generates keys 212 (also referred to as CPIX push keys 212) for both live, VOD (video-on-demand) content and packagers (also referred to as a downstream packagers 212) (e.g., a software-based video processing and delivering entity such as ENVIVIO™). The generated keys 212 are used (e.g., by encryptor 204A) to encrypt the content 216A (also referred as HLS/DASH encrypted content). A typical DRM server (e.g., a WIDEVINE™ server) may generate the license using the keys generated by a key server along with usage rules and generates a license to the client upon license request.

In embodiments of the invention, a video processing server 210 may play the role of a DRM server as it acquires the keys 212 from a service provider 202 using a CPIX client 218 (also referred to as CPIX Client and Key Database 218). However, instead of generating licenses like a DRM server, the content 216A may be decrypted (e.g., by a decryptor within a front end 220 [also referred to as a video processing server front end that parses a manifest/MPD (media presentation description), gets the key 212 and decrypts]). The decrypted content is referred to as clear content 222 (also referred to as clear stream 222) and is output to the module/downstream packager 214 preparing the content for legacy systems (e.g., MEDIACIPHER STBs).

CPIX defines a container format (schema) to exchange content protection information between entities, typically keys 212, their usage rules (used for encrypting the content), and any associated DRM specific information. There are several workflows possible in preparing and consuming a generated CPIX document. For a video processing server 210 of embodiments of the invention, an encryptor producer model can be used to exchange the keys 212 between a producer (encryptor 204A/keyserver 208A) and a consumer such as a DRM server/video processing server 210. Generally, if the content is in DASH format, ISO Common encryption may be used for encrypting the content. APPLE™ HLS uses both AES-128 and sample encryption (10% pattern encryption as defined in ISO Common Encryption standard). The encryptor-producer model can be used to push the keys 212 to the DRM Server/video processing server 210 as a key server 208A generates the keys 212.

In embodiments of the invention, the video processing server 210 may be considered a DRM server since it is part of the head end 102 infrastructure from the CPIX standard perspective. The CPIX document format can be used to provide the keys 212 to the video processing server 210 from the service provider 202 infrastructure. These keys 212 will be used to decrypt the encrypted content 216A and clear content 222 may be translated to MPEG2-TS MEDIACIPHER protected content by a downstream packager 214 for example. In addition, the encryptor 204A/packager 204B may need to insert keys and DRM signaling elements 206 (e.g., DRM signaling elements retrieved from the key server 208A) into an HLS manifest 216B or DASH MPD so the video processing server 210 can acquire the keys 212 ahead of time.

In HLS, EXT-X-KEY tag may be used to signal that segments following the key tag are encrypted and specifies metadata to acquire the key 212. In the case of DASH content, the signaling is done by adding a ContentProtection element in the MPD in addition to adding protection boxes if the content is an ISO base media file format or MP4. If the content 216A is in DASH-TS format, CETS ECM (common encryption for MPEG-2 TS Entitlement Control Messages) can signal key changes.

HLS Key Tag and HLS Session Key

This section describes elements that needs to be added to the HLS Manifest (i.e., within the HLS encrypted content and manifest data 216B) to signal that segments are encrypted and also metadata related to content keys. CPIX HLS Signaling Data (i.e., DRM signaling elements 206) includes EXT-X-KEY or EXT-X-SESSION-Key tag data encoded as base64 binary data.

HLS playlists contains EXT-X-KEY tags that specify how encrypted media segments may be decrypted. An attribute list is associated with each tag. The attribute list applies to the media segments seen until the next EXT-X-KEY tag with the same KEYFORMAT attribute.

A summary of the attributes, relevant to this integration, are in Table A below. A full description of all attributes can be found in [1]. One or more EXT-X-KEY tags may be present in a media playlist, one for each DRM vendor as long as they generate the same key to decrypt the segment.

TABLE A

Relevant HLS Attribute-Values

| Attribute | Value |
| --- | --- |
| METHOD (required) | NONE, AES-128, SAMPLE-AES |
| URI (required) | The value is a quoted-string containing a URI that specifies how to obtain the key. This field is normally populated by the DRM vendor, in this case has to be added by the packager. At minimum, to request the right key Content ID and Key ID must be specified in the URI for video processing server system. |
| IV (optional) | Hexadecimal sequence that specifies a 128-bit unsigned integer; Initialization vector. If absent the media sequence number is used as IV when decrypting a media segment. |
| KEYFORMAT (required) | Quoted string that specifies how the key is represented. As multiple EXT-X-KEY tags may be present in a media playlist, this attribute is used by DRM vendors to select the attribute lists meant for them. Example: Key System "com.widevine" to identify its attribute list. A vendor specific system ID may be used. |
| KEYFORMAT-VERSIONS (optional) | Quoted strings containing one or more positive integers separated by the "/" character. If not present, its value is "1". |

Example EXT-X-KEY

An exemplary EXT-X-KEY tag data is:

```
EXT-X-KEY: METHOD=SAMPLE-AES, \
URI="data:text/plain;base64(Commscope specific data,
Content ID , Key ID, Crypto Period)\
IV=0x6df49213a781e338628d0e9c812d328e, \
KEYFORMAT="com.commscope..", \
KEYFORMATVERSIONS="1"
```

The optional EXT-X-SESSION-KEY tag allows encryption keys from media playlists to be specified in a master playlist. This allows the client to preload these keys without having to read the Media Playlist(s)first. The format of such a key is:

EXT-X-SESSION-KEY:<attribute list>

All attributes defined for the EXT-X-KEY tag may also be defined for the EXT-X-SESSION-KEY, except that the value of the METHOD attribute MUST NOT be NONE. If an EXT-X-SESSION-KEY is used, the values of the METHOD, KEYFORMAT and KEYFORMATVERSIONS attributes MUST match any EXT-X-KEY with the same URI value.

DASH PSSH (Protection System Specific Header Box), MPD

DASH uses the ISO Common Encryption scheme as defined in [4] and [5] for both MP4 and MPEG2-TS format segments. Content protection elements are added by DASH to the MPD schema to signal that content is encrypted.

The content protection element @schemeIdUri attribute is used to identify a content protection scheme. This element @value or extension attributes and elements provide default key-id, key system, and encryption algorithms. The content protection element can be extended in a separate namespace to provide information specific to the content protection scheme.

Content protection elements aid in acquiring keys ahead of time before decrypting the content, providing the Default Key ID or list of Key Ids used to encrypt the content.

PSSH is inserted in the MPD for DASH. The following MPD example for DASH-MP4, PSSH is the same as that in a Track Encryption Box (tenc).

```
<ContentProtection schemeIdUri=
"http://Commscope.com/myDrmSchema">
 - <cenc:pssh>
 - Base64Encode(System ID, Keys IDs, Content
 protection specific data)
 </cenc:pssh>
</ContentProtection>
```

The MPEG2-TS Common encryption standard specifies that the PSSH element can be carried in a separate PID (inband) or out of band. Accordingly, the same content protection element with PSSH like attributes can be added for DASH-TS content to a MPD.

For DASH-TS like MP4, content protection elements can be added to provide the key ID, algorithm, crypto period, and encryption type by adding extension attributes.

Additional key change/rotation information can be provided by CETS ECM (see [5]).

CPIX Sample Document

A clear key CPIX document is shown in Table B for clarity. Generally the key values are encrypted using a documentation key and the document is signed with an authentication key.

TABLE B

CPIX Sample Document

```
<?xml version="1.0" encoding="UTF-8"?>
<CPIX xmlns:pskc="urn:ietf:params:xml:ns:keyprov:pskc"
xmlns:enc="http://www.w3.org/2001/04/xmlenc#"
xmlns:ds="http://www.w3.org/2000/09/xmldsig#"
xmlns="urn:dashif:org:cpix"
xmlns:xsd="http://www.w3.org/2001/XMLSchema"
xmlns:xsi="http://www.w3.org/2001/XMLSchema-instance">
<ContentKeyList>
  <ContentKey kid="40d02dd1-61a3-4787-a155-2325d47b80">
  <Data>
  <pskc:Secret>
  <pskc:PlainValue>gPxt0PMwrHM4TdjwdQmhhQ==
  </pskc:PlainValue>
  </pskc:Secret></Data>
  </ContentKey>
  <ContentKey kid="0a30ea4f-539d-4b02-94b2-2b3fba2576d3">
  <Data><pskc:Secret>
```

TABLE B-continued

CPIX Sample Document

```
<pskc:PlainValue>x/gaoS/fDi8BqGNIhkixwQ==
</pskc:PlainValue>
</pskc:Secret>
</Data></ContentKey>
<ContentKey kid="9f7908fa-5d5c-4097-ba53-50edc2235fbc">
<Data>
<pskc:Secret>
<pskc:PlainValue>3iv9lYwafpe0uEmxDc6PSw==
</pskc:PlainValue></pskc:Secret></Data>
</ContentKey><ContentKey kid="fac2cbf5-889c-412b-
a385-04a29d409bdc"><Data>
<pskc:Secret><pskc:PlainValue>1OZVZZoYFSU2X/7qT3sHwg==
</pskc:PlainValue></pskc:Secret></Data>
</ContentKey>
</ContentKeyList></CPIX>
```

Hardware Environment

Figure 5:
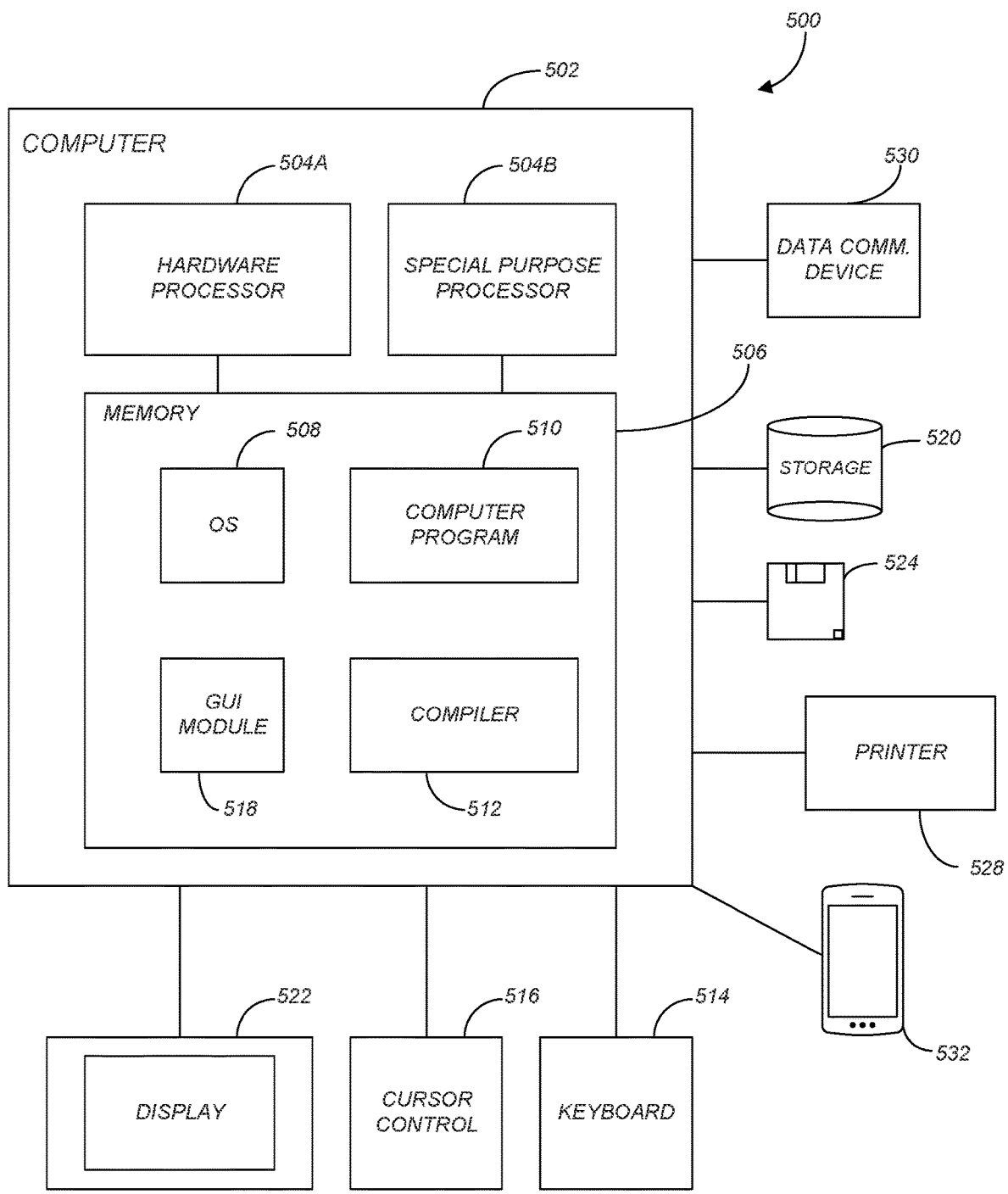
FIG. 5 is an exemplary hardware and software environment used to implement one or more embodiments of the invention.

FIG. 5 is an exemplary hardware and software environment 500 (referred to as a computer-implemented system and/or computer-implemented method) used to implement one or more embodiments of the invention. The hardware and software environment includes a computer 502 and may include peripherals. Computer 502 may be a user/client computer (e.g., a set top box), server computer (e.g., a video processing server 210 within or providing a headend 102), or may be a database computer. The computer 502 comprises a hardware processor 504A and/or a special purpose hardware processor 504B (hereinafter alternatively collectively referred to as processor 504) and a memory 506, such as random access memory (RAM). The computer 502 may be coupled to, and/or integrated with, other devices, including input/output (I/O) devices such as a keyboard 514, a cursor control device 516 (e.g., a mouse, a pointing device, pen and tablet, touch screen, multi-touch device, etc.) and a printer 528. In one or more embodiments, computer 502 may be coupled to, or may comprise, a portable or media viewing/listening device 532 (e.g., an MP3 player, IPOD, NOOK, portable digital video player, cellular device, personal digital assistant, etc.). In yet another embodiment, the computer 502 may comprise a multi-touch device, mobile phone, gaming system, internet enabled television, television set top box, or other internet enabled device executing on various platforms and operating systems.

In one embodiment, the computer 502 operates by the hardware processor 504A performing instructions defined by the computer program 510 (e.g., a computer-aided design [CAD] application) under control of an operating system 508. The computer program 510 and/or the operating system 508 may be stored in the memory 506 and may interface with the user and/or other devices to accept input and commands and, based on such input and commands and the instructions defined by the computer program 510 and operating system 508, to provide output and results.

Output/results may be presented on the display 522 or provided to another device for presentation or further processing or action. In one embodiment, the display 522 comprises a liquid crystal display (LCD) having a plurality of separately addressable liquid crystals. Alternatively, the display 522 may comprise a light emitting diode (LED) display having clusters of red, green and blue diodes driven together to form full-color pixels. Each liquid crystal or pixel of the display 522 changes to an opaque or translucent state to form a part of the image on the display in response to the data or information generated by the processor 504 from the application of the instructions of the computer program 510 and/or operating system 508 to the input and commands. The image may be provided through a graphical user interface (GUI) module 518. Although the GUI module 518 is depicted as a separate module, the instructions performing the GUI functions can be resident or distributed in the operating system 508, the computer program 510, or implemented with special purpose memory and processors.

In one or more embodiments, the display 522 is integrated with/into the computer 502 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 502 according to the computer program 510 instructions may be implemented in a special purpose processor 504B. In this embodiment, some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program 510 instructions. In one embodiment, the special purpose processor 504B is an application specific integrated circuit (ASIC).

The computer 502 may also implement a compiler 512 that allows an application or computer program 510 written in a programming language such as C, C++, Assembly, SQL, PYTHON, PROLOG, MATLAB, RUBY, RAILS, HASKELL, or other language to be translated into processor 504 readable code. Alternatively, the compiler 512 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 510 accesses and manipulates data accepted from I/O devices and stored in the memory 506 of the computer 502 using the relationships and logic that were generated using the compiler 512.

The computer 502 also optionally comprises an external communication device such as a modem, satellite link, Ethernet card, or other device for accepting input from, and providing output to, other computers 502.

In one embodiment, instructions implementing the operating system 508, the computer program 510, and the compiler 512 are tangibly embodied in a non-transitory computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of computer program 510 instructions which, when accessed, read and executed by the computer 502, cause the computer 502 to perform the steps necessary to implement and/or use the present invention or to load the program of instructions into a memory 506, thus creating a special purpose data structure causing the computer 502 to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 502.

CONCLUSION

This concludes the description of the preferred embodiments of the present disclosure. The following describes some alternative embodiments for accomplishing the present invention. For example, any type of computer, such as a mainframe, minicomputer, or personal computer, or computer configuration, such as a timesharing mainframe, cloud computing system, local area network, or standalone personal computer, could be used with the present invention.

In addition, advantages of embodiments of the invention differ from prior art certificate chain trust implementations while also not requiring hardware token/dongles. Embodiments of the invention are configurable as additional information is set forth/defined in a client certificate that may be used for additional authentication/verification, as well as for authorization of different services based on different clients/client types.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

REFERENCES

[1] HLS specification—"HTTP Live Streaming $2^{nd}$ Edition", draft-pantos-hls-rfc8216bis-07 (Apr. 30, 2020), available from ietf.org.
[2] DASH ISO/IEC 23009-1:2019, "Information technology—Dynamic adaptive streaming over HTTP (DASH)—Part 1: Media presentation description and segment formats" (First Edition 2012 Apr. 1).
[3] ISO/IEC 23001-7:2016 $3^{rd}$ Edition, "Information technology—MPEG systems technologies—Part 7: Common encryption in ISO base media file format files" (June 2015).
[4] ISO/IEC 23001-9:2016 $2^{nd}$ Edition, "Information technology—MPEG systems technologies—Part 9: Common encryption of MPEG-2 transport streams" (2016 Aug. 1).
[5] "DASH-IF Implementation Guidelines: Content Protection Information Exchange Format (CPIX)", v2.2, Mar. 22, 2019 published by the DASH Industry Forum.

What is claimed is:

1. A computer-implemented method of processing video content on a headend, said headend comprising a multi-system operator that transmits broadcast video content to recipients using a cable network, provides the video content to the recipients, and provides Internet services to the recipients using the cable network, comprising:
    (a) a video processing server authenticating with a key server;
    (b) the key server exchanging public keys with a client, wherein the client is part of the video processing server, wherein the recipient is remote from the video processing server, wherein the client and the recipient are remote from one another;
    (c) the key server generating a content key;
    (d) the key server generating a document, wherein the generating the document comprises populating the document with the content key, and wherein the document is signed with the public key that was exchanged;
    (e) the client receiving the document, extracting the content key from the document, and saving the content key to a database;
    (f) the headend encrypting the video content using the content key resulting in encrypted video content, and adding digital rights management (DRM) signaling elements to a manifest;
    (g) receiving the encrypted video content and manifest in the video processing server;
    (h) the video processing server extracting a key ID from the manifest;
    (i) providing the key ID to the client and receiving the content key from the client in response;
    (j) the headend decrypting the encrypted video content using the content key resulting in clear content of video content that is not encrypted; and
    (k) providing the clear content of video content that is not encrypted to a downstream packager that encrypts and repackages the video content for transmission to recipients as encrypted video content.

2. The computer-implemented method of claim 1, wherein:
    the key server generating the content key further comprises the key server generating attributes associated with the content key;
    the generating the document comprises populating the document with the attributes; and
    the attributes are used in the decrypting.

3. The computer-implemented method of claim 2, wherein the attributes comprise a crypto period and crypto algorithm of the content key.

4. The computer-implemented method of claim 1, further comprising the key server caching the content key in a database.

5. The computer-implemented method of claim 1, wherein the client comprises a CPIX client and the document comprises a CPIX document.

6. The computer-implemented method of claim 1, wherein:
    an encryptor/packager encrypts the video content and adds the DRM signaling elements to the manifest; and
    the encryptor/packager sends the encrypted video content and the manifest to the video processing server.

7. The computer-implemented method of claim 1, wherein the providing the key ID to the client and receiving the content key from the client in response comprises the client pulling the content key from the key server.

8. The computer-implemented method of claim 1, wherein the client receives the document via a push from a service provider.

9. The computer-implemented method of claim 1, wherein the video processing server extracts the key ID from the manifest as the manifest is being parsed.

\* \* \* \* \*